June 1, 1937.  B. BRONSON  2,082,047

FLOOR COVERING

Filed April 20, 1932

Inventor
BUDD BRONSON.

Kwis Hudson & Kent
attys.

Patented June 1, 1937

2,082,047

UNITED STATES PATENT OFFICE 2,082,047

FLOOR COVERING

Budd Bronson, Cleveland, Ohio, assignor to The Ohio Rubber Company, Cleveland, Ohio, a corporation of Ohio Application April 20, 1932, Serial No. 606,436

1 Claim. (Cl. 154—49)

This invention relates generally to laminated structures, and more particularly to a novel and improved form of mat or floor covering which is well suited for use on the floors of vehicle compartments and for other purposes.

In vehicle floor mats or coverings, as heretofore constructed, a resilient fibrous pad has been attached to the under surface of a soft rubber wear sheet or tread, as by cementing, or by vulcanization of the rubber tread in contact with the pad. Although mats of this general type have been regarded as very serviceable, they are unattractive in appearance, and do not harmonize with the fabric upholstery usually provided in passenger vehicles, principally because of the inherently dull and drab surface of the rubber tread. Moreover the rubber tread is cold and unpleasant to the touch and is easily torn, smeared or otherwise disfigured. Attempts have been made to improve the appearance of the rubber tread of such mats by molding configurations thereon and also by coloring the rubber, but because of the inherent characteristics of soft rubber the results have been generally unsatisfactory. Moreover when coloring is incorporated in the rubber it is extremely difficult, if not impossible, to obtain uniform distribution of the coloring for the full extent of tread surface of each mat, and so that the treads of mats produced in large numbers will all be of the same color shade.

Accordingly it is an object of my invention to provide a composite floor covering of improved and durable form having a woven fabric wear surface which imparts to the covering many of the characteristics of carpeting.

Another object of this invention is to provide an improved floor covering, embodying a resilient pad and having a woven fabric tread extending over and attached to the pad.

Another object of this invention is to provide an improved floor covering embodying a resilient fibrous pad having a wear-resistant woven fabric tread extending over the same, and a waterproof binding material connecting said tread and pad.

A further object of this invention is to provide a novel form of vehicle floor mat embodying a resilient pad and a wear-resistant woven fabric tread extending over the pad, and having an intermediate layer of rubber vulcanized to the pad and to the fabric tread.

It is also an object of this invention to provide a novel method of making floor coverings.

Other objects and advantages of the invention will be apparent from the following description, when taken in conjunction with the accompanying sheet of drawings, wherein Fig. 1 is a plan view of a floor covering constructed according to my invention;

Detailed reference will now be made to the accompanying drawing, wherein I have illustrated what I now regard to be the preferred forms of my improved floor covering. Before proceeding with the detailed description, it should be understood that although the floor coverings illustrated in this instance are vehicle floor mats, the invention may be embodied in mats or coverings intended for various uses, and in various forms of mats other than those illustrated herein.

Figure 1:
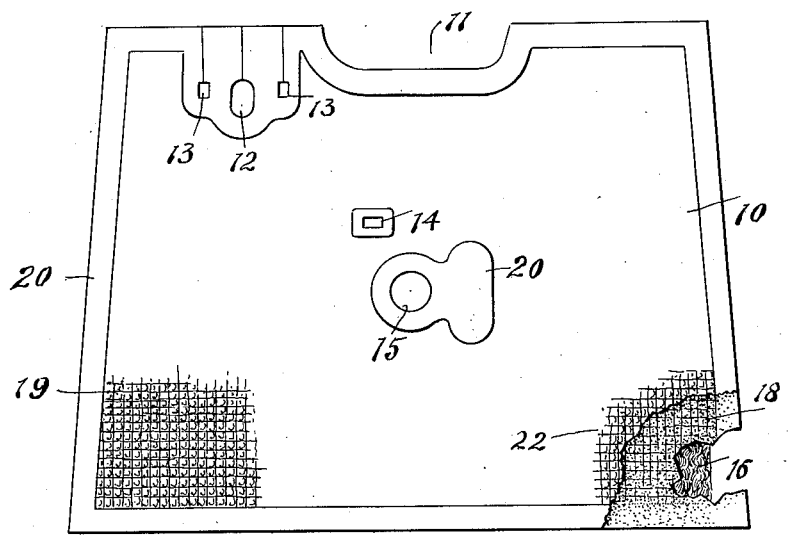

In the embodiment of my invention illustrated in Fig. 1, I have represented a floor mat 10 for the front compartment of a motor vehicle. As is usual in floor coverings of this general type, my improved mat is of quadrangular shape to conform to the shape of the vehicle compartment, and is provided at one edge thereof with a recess 11 to accommodate cables, tubes and the like leading to instruments mounted on the dash of the vehicle. The mat may also be provided with numerous openings or cut-outs extending therethrough to accommodate various vehicle controls, such as the openings 12 and 13 which accommodate, respectively, the steering column and the control pedals adjacent thereto, and the openings 14 and 15, which may accommodate, respectively, the usual fuel control lever and the gear shift lever.

According to my invention this floor mat comprises a resilient pad or cushion 16, and a woven fabric wear sheet or tread 17 which extends over the cushion and is attached thereto by an intermediate water-proof binder 18. The resilient pad may be formed of any appropriate material, for example, this pad may be a commercial felt composed of loosely compacted fibers, such as jute, sisal, or any other suitable fibers. When the pad is formed of felted fibres, a woven fabric may be incorporated therein to reinforce the pad and to afford a good bond between the pad and the binder.

The tread 17 comprises a sheet or layer of woven fabric, of wear resistant character, and although various woven fabrics may be used for this purpose, I prefer to employ a fabric woven from threads composed of jute fibers, and which is commercially known as Scotch cloth. The particular cloth mentioned can be procured at low cost and is composed of relatively coarse, closely woven threads, and is well suited for this purpose because it unites well with the binder, and in the finished mat, it resembles carpeting as to appearance and wearing qualities. As is well understood by those skilled in the textile art, Scotch cloth is a closely woven, substantially pileless fabric composed of warp and weft threads only. This layer of woven fabric extends over the resilient pad 16 to provide the latter with a wear resistant upper surface or tread, and is connected to the pad by the water-proof binder 18. As this water-proof binder I prefer to employ a relatively thin sheet of rubber, which is coextensive with the woven fabric 17, and which is attached to the adjacent surfaces of the fabric and pad by vulcanization.

In constructing my improved floor covering any suitable method may be employed but I prefer to first prepare the woven fabric tread by subjecting the same to a shrinking treatment, and then dyeing this fabric to impart thereto a desired color. In some instances the shrinking of the woven fabric may be omitted or may be incorporated with the dyeing operation, but it is preferable that the woven fabric be shrunk prior to its assembly with the resilient pad, because bulging or twisting of the mat, due to shrinkage of the fabric during the vulcanizing operation or subsequent thereto, will be entirely eliminated and the covering will always lie flat on the floor. The resilient pad and the woven fabric are preferably cut into sections, determined by the size of the mat to be produced, and are placed in a suitable vulcanizing apparatus with a thin sheet of uncured rubber therebetween. If desired, however, the pad, fabric and intermediate rubber sheet may be left in strip form and passed through a suitable vulcanizing apparatus by a step by step movement. In the vulcanizing apparatus the mat is subjected to heat and pressure which causes the intermediate sheet of rubber to be cured or vulcanized in contact with the adjacent surfaces of the fabric and resilient pad. During this vulcanizing operation some of the rubber is forced into the woven fabric and into the resilient pad, thereby impregnating these layers with some of the rubber and firmly uniting these layers.

Figure 7:
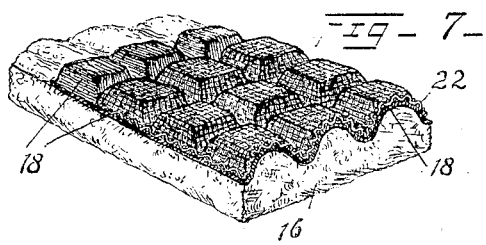
Fig. 7 is a perspective view on an enlarged scale.

To provide the surface of the woven fabric with indentations, it may be desirable to place a sheet of commercial wire screen, of suitable characteristics, on the upper surface of the fabric before the vulcanizing pressure is applied. During the vulcanizing operation the wires of this screen cause portions of the fabric to be pressed into the intermediate rubber sheet, thereby providing the fabric with numerous indentations, as shown in Fig. 7, which form a recurring pattern and which roughen and improve the appearance of the finished article by increasing its resemblance to carpeting. The indentations thus formed also improve the wearing qualities of the fabric and provide increased adhesion between the fabric and the layer of rubber. If desired, these indentations may extend over the entire surface of the mat, or may extend only over a portion thereof, such as the patterned area 19 indicated in Fig. 1, in which case the border sections 20, around the edges of the mat and around the control openings, may be left plain or may be provided with other characteristics to distinguish them from the patterned area 19.

During the vulcanizing operation the pressure usually causes the resilient fibrous pad 16 to be compressed, and to enliven, or restore the resiliency of this pad, I subject the same to an enlivening treatment. The enlivening of this fibrous pad may be accomplished in various ways, but I prefer to accomplish this result by subjecting the fibrous pad to a treatment with a fluid, such as steaming.

Heretofore in the construction of floor coverings of this type embodying a relatively large amount of rubber, it has been impossible to form the control openings during the vulcanizing operation because the high and variable coefficients of expansion and contraction of the rubber, have made it impossible to correctly and accurately locate these openings. In my novel mat construction the use of the preshrunk woven fabric tread 17, permits the fabric tread to be accurately cut as to size, and also permits the control openings to be accurately located and cut prior to the vulcanizing operation, so that by the use of suitable dams on the vulcanizing mold, the rubber can be molded around the edges of the tread and around the edges of the control openings. The molding of the rubber around these edges during the vulcanizing operation, eliminates the need for a subsequent trimming operation which would leave the edges of the fabric in a condition prone to fray.

Figure 2:
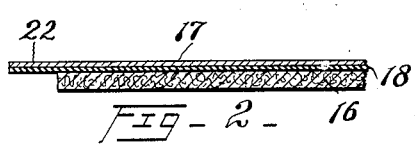
Fig. 2 is a partial transverse sectional view thereof.
Figure 3:
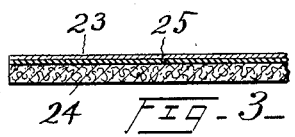
Fig. 3 is a similar sectional view of another floor covering embodying my invention.

In my novel floor covering, as shown in Figs. 1 and 2, I have represented the woven fabric tread 17 as extending laterally beyond the edge of the resilient pad 16 as a flexible margin 22 which will tend to lie flat upon the floor when the mat is in place. In forming this extended margin, the rubber sheet is preferably made coextensive with the woven fabric, so as to reinforce the latter throughout these marginal portions. If desired, however, the mat may be constructed, as shown in Fig. 3, with a woven fabric tread 23 having its edges coincident with the edges of the resilient pad 24, to which the fabric is connected by the intermediate layer of vulcanized rubber 25.

Figure 4:
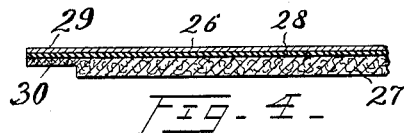
Figs. 4, 5 and 6 are similar partial sectional views showing other floor coverings constructed according to my invention.
Figure 5:
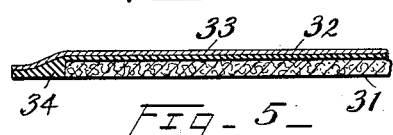
Figure 6:
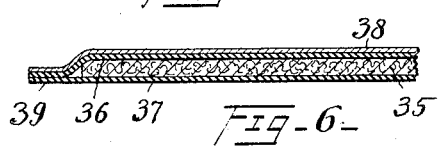

In Figs. 4, 5 and 6 of the drawing I have shown other forms which my improved mat may assume. In Fig. 4 I show a mat having a woven fabric tread 26 extending over a resilient pad 27 and connected to the upper surface thereof by a layer of vulcanized rubber 28. In this construction, the layer of resilient material is coextensive with the woven fabric and with the intermediate layer of rubber, but to provide the mat with marginal portions 29 of reduced thickness and to reinforce the edges of the fibrous pad, I impregnate marginal portions of the pad with a suitable binding material and subject the same to pressure to form the compacted border strips 30. Any suitable material may be used in impregnating the border portions of the resilient pad, such as a rubber compound which may be cured during the vulcanization of the intermediate rubber sheet 28. The resilient pad 27 may be enlivened after the vulcanization of the rubber sheet 28 and the binding material of the border sections. If desired, however, the rubber sheet 28 may be vulcanized and the pad 27 enlivened prior to the impregnating and compacting of the marginal portions of the pad.

In Fig. 5 of the drawing I have shown a floor covering having a resilient pad 31, and a woven fabric tread 32 which is connected to the pad by an intermediate layer of vulcanized rubber 33. To provide the mat with a margin which will lie flat upon the floor and which will prevent fraying of the resilient pad, I extend the rubber layer 33 to form a thickened marginal section or body of rubber 34 along the edges of the resilient pad. This thickened margin of rubber may be tapered, as indicated in Fig. 5, or may be of any other suitable form. The woven fabric tread 32 is preferably extended outwardly over the thickened marginal portions 34.

In Fig. 6 I have shown a floor covering wherein the resilient pad 35 is completely encased between top and bottom sheets of rubber 36 and 37, and a woven fabric tread 38 is extended over and vulcanized to the top rubber sheet. In this construction the rubber sheets preferably extend beyond the edges of the resilient pad to form a relatively thin margin 39, and the woven fabric tread 38 is extended laterally over this margin. In producing a floor covering of this form the resilient pad 35 may be first connected to the tread 38 by vulcanization of the rubber sheet 36, after which the resilient pad may be enlivened, as by steaming or other treatment. The bottom rubber sheet may then be applied and secured around its margin to the rubber sheet 36 by vulcanization or cementing. If desired, however, the top and bottom rubber sheets 36 and 37 may be vulcanized at the same time and thereby united around their edges during the vulcanizing operation. When constructed in this manner it may be desirable to prevent matting of the fibers of the resilient pad by maintaining air or other fluid within the body of the pad during the vulcanizing operation, which fluid may be generated in the pad, or introduced into the same by means of one or more nozzles embodied in the vulcanizing mold and arranged to pierce the bottom rubber sheet.

It will now be readily seen that I have provided a novel and improved form of floor covering, embodying a resilient pad possessing cushioning and insulating characteristics, and also having a woven fabric wear surface or tread which extends over the resilient pad and is united thereto by a water-proof binding material. In the novel mat construction which I have provided the woven fabric tread gives the covering carpet-like characteristics as to appearance, wear and the sense of touch. Moreover, this woven fabric tread may have any desired color and eliminates the cold and drab surface which has characterized rubber-surfaced floor coverings heretofore used. It is also characteristic of my floor covering that the woven fabric tread is very durable, and can be easily cleaned by brushing or washing, the intermediate layer of rubber serving to prevent dust or water from penetrating into the resilient pad.

While I have illustrated and described the floor covering of my invention in a detailed manner, it should be understood, however, that I do not intend to limit myself to the precise details of construction and arrangements illustrated and described, but regard my invention as including such changes and modifications as do not involve a departure from the spirit of the invention and the scope of the appended claim.

Having thus described my invention, I claim:

As an article of manufacture, a flexible substantially flat vehicle floor mat adapted to be fitted into the compartment of an automobile for cushioning and insulating purposes, comprising a cushioning and insulating backing layer of felt, a closely woven substantially pileless fabric extending over the top of said layer and providing a substantially coextensive wear sheet for the same, and a connecting layer of rubber substantially uniformly uniting said wear sheet with said backing layer, said wear sheet being indented at numerous points toward the cushioning layer and into the connecting layer whereby the wear sheet is provided with a roughened surface characteristic.

BUDD BRONSON.